US010080963B2

(12) United States Patent
Oka

(10) Patent No.: US 10,080,963 B2
(45) Date of Patent: Sep. 25, 2018

(54) OBJECT MANIPULATION METHOD, OBJECT MANIPULATION PROGRAM, AND INFORMATION PROCESSING APPARATUS

(71) Applicant: SONY INTERACTIVE ENTERTAINMENT INC., Tokyo (JP)

(72) Inventor: Masaaki Oka, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 22 days.

(21) Appl. No.: 15/119,814

(22) PCT Filed: Mar. 20, 2015

(86) PCT No.: PCT/JP2015/058391
§ 371 (c)(1),
(2) Date: Aug. 18, 2016

(87) PCT Pub. No.: WO2015/146813
PCT Pub. Date: Oct. 1, 2015

(65) Prior Publication Data
US 2017/0056774 A1    Mar. 2, 2017

(30) Foreign Application Priority Data

Mar. 28, 2014   (JP) .................................. 2014-068752
Mar. 28, 2014   (JP) .................................. 2014-068753

(51) Int. Cl.
*A63F 13/57*     (2014.01)
*A63F 13/42*     (2014.01)
(Continued)

(52) U.S. Cl.
CPC ............ *A63F 13/57* (2014.09); *A63F 13/213* (2014.09); *A63F 13/42* (2014.09); *A63F 13/655* (2014.09);
(Continued)

(58) Field of Classification Search
CPC ....... G06T 17/20; G06T 17/205; G06T 15/04; G06T 11/40; G06T 15/005; G06T 11/60;
(Continued)

(56) References Cited

U.S. PATENT DOCUMENTS 5,168,677 A * 12/1992 Pronsato ............... A63F 9/1208
52/81.1
7,142,212 B1   11/2006 Hanai et al.
(Continued)

FOREIGN PATENT DOCUMENTS

JP    7-281666 A      10/1995
JP    2000-196914     7/2000
(Continued)

OTHER PUBLICATIONS

International Search Report and Written Opinion dated Jun. 16, 2015, from the corresponding PCT/JP2015/058391.
(Continued)

*Primary Examiner* — Todd Buttram
(74) *Attorney, Agent, or Firm* — Katten Muchin Rosenman LLP

(57) ABSTRACT

In an object (OB) manipulation method of manipulating an object (OB) displayed on a display apparatus for deformation, a control apparatus configured to control the display apparatus executes a step of setting a polyhedron (POL) with a given point (P0) in the object (OB) being a center; a step of dividing a space inside the polyhedron (POL) by a vector going from the center (P0) of the polyhedron (POL) to apexes (P1 through P12) of the polyhedron (POL); a step of discriminating in which of the divided spaces an apex of the object (OB) is included; a step of storing a decomposition coefficient of the apex (POB) of the object (OB) by three vectors making up the space including the apex (POB) of the object (OB); and a step of deforming the object (OB) in
(Continued)

accordance with the deformation manipulation acted on the polyhedron (POL) and displaying the deformed object (OB).

4 Claims, 16 Drawing Sheets

(51) Int. Cl.
*A63F 13/655* (2014.01)
*A63F 13/213* (2014.01)

(52) U.S. Cl.
CPC . *A63F 2300/6045* (2013.01); *A63F 2300/695* (2013.01)

(58) Field of Classification Search
CPC ............... G09G 5/14; G09G 2340/10; G09G 2340/125; H04N 5/44504
See application file for complete search history.

(56) References Cited

U.S. PATENT DOCUMENTS

| | | | | |
|---|---|---|---|---|
| 8,836,701 | B1* | 9/2014 | Rockwood | G06F 17/50 345/419 |
| 2001/0002130 | A1* | 5/2001 | Suzuoki | G06T 17/20 345/420 |
| 2001/0042245 | A1 | 11/2001 | Iwamura | |
| 2003/0007678 | A1* | 1/2003 | Ohta | G06T 17/00 382/154 |
| 2004/0125091 | A1* | 7/2004 | Kallay | G06T 17/20 345/204 |
| 2005/0264554 | A1* | 12/2005 | Deming | G06T 11/20 345/418 |
| 2014/0059484 | A1 | 2/2014 | Marks et al. | |
| 2014/0354639 | A1* | 12/2014 | Rockwood | G06F 17/50 345/420 |
| 2015/0161805 | A1* | 6/2015 | Glazer | H04L 67/10 345/441 |
| 2015/0339423 | A1* | 11/2015 | Nakagawa | G06F 17/5068 716/55 |
| 2016/0093076 | A1* | 3/2016 | Eluard | G06F 17/2211 345/440 |

FOREIGN PATENT DOCUMENTS

| | | |
|---|---|---|
| JP | 2001-006003 | 1/2001 |
| JP | 2001-100906 | 4/2001 |
| JP | 2002063595 A | 2/2002 |
| JP | 2004-246578 | 9/2004 |
| JP | 2005-31799 | 2/2005 |
| JP | 2005-216061 | 8/2005 |
| JP | 2005-301479 A | 10/2005 |
| JP | 2006-244272 | 9/2006 |
| JP | 2007-156950 | 6/2007 |
| JP | 2009-519552 | 5/2009 |
| JP | 2009-134693 | 6/2009 |
| JP | 2010-67062 | 3/2010 |
| JP | 2010-515170 | 5/2010 |
| JP | 2011-238069 | 11/2011 |
| JP | 2012053674 A | 3/2012 |
| JP | 2013-009748 | 1/2013 |
| JP | 2013-101526 | 5/2013 |
| WO | 2007070733 A2 | 6/2007 |
| WO | 2008/083205 | 7/2008 |

OTHER PUBLICATIONS

Japanese Notification of Reasons for Refusal dated Sep. 20, 2016 from corresponding Application No. 2014-068753.
International Preliminary Report on Patentability and Written Opinion of the International Searching Authority dated Oct. 13, 2016 from corresponding Application No. PCT/JP2015/058391.
Notification of Reason for Refusal dated Mar. 21, 2017, from the corresponding Japanese Patent Application No. 2014-068753.

* cited by examiner

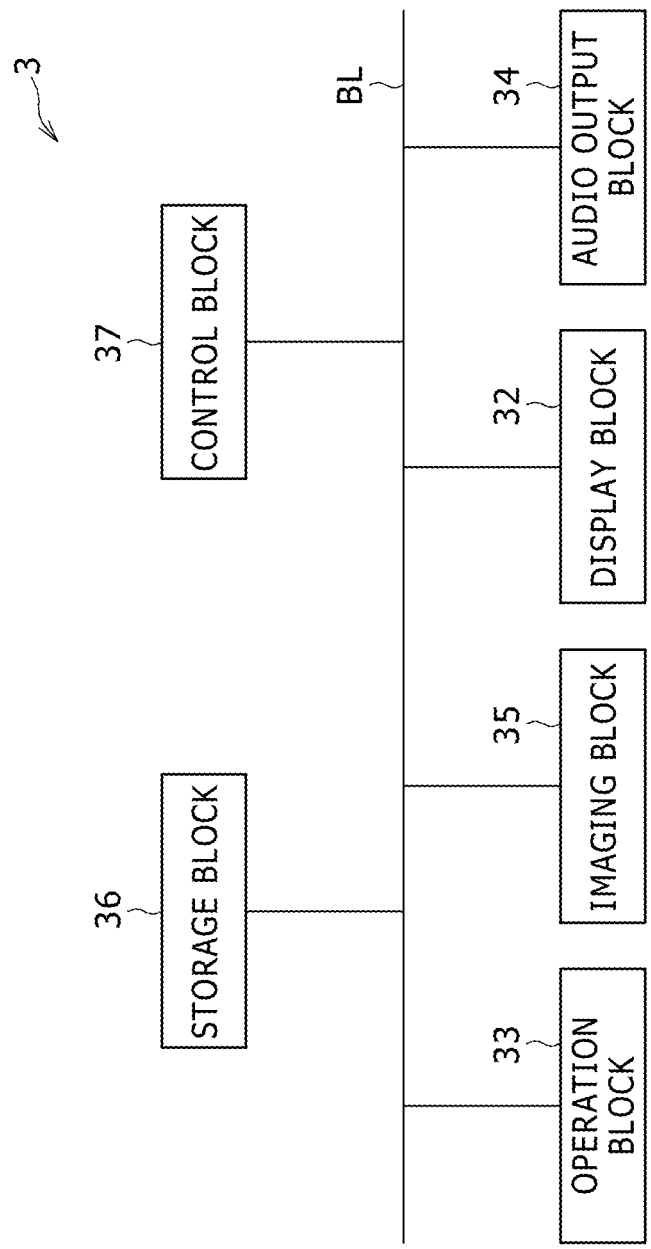

F I G . 1 2
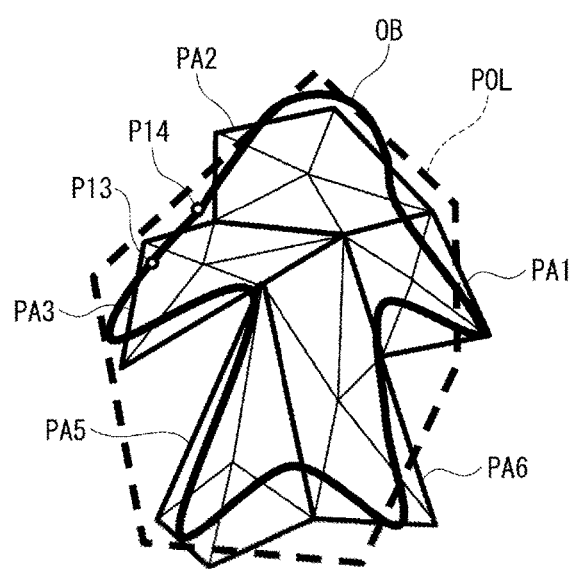

OBJECT MANIPULATION METHOD, OBJECT MANIPULATION PROGRAM, AND INFORMATION PROCESSING APPARATUS

TECHNICAL FIELD

The present invention relates to an object manipulation method, an object manipulation program, and an information processing apparatus.

BACKGROUND ART

With game programs and the like, displaying a character that is an object in a real manner has been desired. Means of representing characters in a real manner include a skeleton animation technique (refer to PTL 1 for example). In skeleton animation, the bones of a skeleton model with each part being a bone are covered with a surface called a skin to provide expression.

Next, a technique called skinning is applied to the expression of the surface movement of the skin, further enhancing real expression.

Skinning is a method of deforming the skin by making it follow the movement of the bones constituting a skeleton.

In addition, a technique is known in which the hand finger part of a taken image is detected on the taken image taken with a camera or the like and a GUI (Graphical User Interface) member is displayed on the detected hand finger part, thereby using the image of the hand finger part as a pointer (refer to PTL 2 for example).

According to this technique, a user can execute GUI operations such as instruction, selection, and movement onto a GUI member displayed on a taken image.

CITATION LIST

Patent Literatures

[PTL 1]
Japanese Patent Laid-Open No. 2002-63595
[PTL 2]
Japanese Patent Laid-Open No. 2012-53674

SUMMARY

Technical Problem

However, in the skinning described in the above-mentioned PTL 1, an orthogonal coordinate system is set for each of the bones and the apex of an object near two or more bones is represented by weighted addition of an orthogonal coordinate system of two or more bones. Hence, the weight must be defined for each object, thereby resulting in problem of complicated arithmetic processing. In addition, physically modeling bones requires to define not only the location and direction of a coordinate system, but also the elasticity of a joint between adjacent bone coordinate systems; however, even if these are defined, the number of links is small, thereby presenting a problem of the low joint constraint force and joint instability.

Further, the technique described in the above-mentioned PTL 2 displays a GUI member on the image of a hand finger part; therefore, the image of the hand finger part for operating the displayed GUI member is handled as only a still image. Therefore, if an image to be composed is a moving image or the like, a problem occurs that the smooth manipulation of a GUI member by following the movement of the hand finger part on the moving image is difficult.

Therefore, an object of the present invention is to provide an object manipulation method, an object manipulation program, and an information processing apparatus that are intended to mitigate arithmetic processing load, deform an object and display the deformed object with stability after physical modeling, and smoothly manipulate an object displayed on a moving image in a composite manner by following a change on the moving image.

Solution to Problem

According to a first aspect of the present invention, there is provided an object manipulation method of manipulating an object displayed on a display apparatus for deformation. The object manipulation method includes a step of setting, by a control apparatus configured to control the display apparatus, a polyhedron with a given point in the object being a center; a step of dividing, by the control apparatus, a space inside the polyhedron by a vector going from the center of the polyhedron to an apex of the polyhedron; a step of discriminating, by the control apparatus, in which of the divided spaces an apex of the object is included; a step of storing, by the control apparatus, a decomposition coefficient of the apex of the object by three vectors making up the space including the apex of the object; and a step of deforming, by the control apparatus, the object in accordance with the deformation manipulation acted on the polyhedron and displaying the deformed object.

According to the object manipulation method of the first aspect, a polyhedron is set with a given point in an object being a center; a space inside the polyhedron is divided by a vector going from the center of the polyhedron to an apex thereof; in which of the divided spaces an apex of the object is included is discriminated; a decomposition coefficient of the apex of the object is stored by three vectors making up the space including the apex of the object; and the object is deformed in accordance with the deformation manipulation acted on the polyhedron and the deformed object is displayed. Therefore, unlike the skinning based on bones, the weighted addition of an orthogonal coordinate system of two or more bones need not be executed, thereby mitigating the arithmetic processing load of a control apparatus.

Further, according to this deformation manipulation, a joint between coordinate systems need not be considered, resulting in displaying of an object for deformation with stability.

According to a second aspect of the present invention, in the object manipulation method according to the first aspect, an object is divided into a plurality of parts in advance and a polyhedron is set for each of the plurality of parts.

According to the second aspect, a polyhedron is set for each part and each polyhedron can be manipulated for deformation. Therefore, even an object having a complicated form can be deformed and displayed in accordance with the deformation manipulation, thereby also mitigating the arithmetic processing load.

According to a third aspect of the present invention, there is provided an object manipulation method of displaying a moving image taken by an imaging apparatus onto a display apparatus and manipulating an object displayed on the displayed moving image in a composite manner. The object manipulation method includes a step of generating, by a control apparatus configured to control the imaging apparatus and the display apparatus, an optical flow on the basis of at least two frame images making up the moving image taken by the imaging apparatus; a step of detecting, by the control apparatus, a motion vector at a display position of the object from the generated optical flow; and a step of manipulating, by the control apparatus, the object on the basis of the detected motion vector.

It should be noted that, in the generation of an optical flow, an optical flow is generated from at least two frame images making up a moving image. Optical flows can be generated by the known block matching method, gradient method or the like.

The object manipulation method according to the third aspect generates an optical flow on the basis of at least two frame images making up a moving image taken by an imaging apparatus and detects a motion vector at a display position of an object from the generated optical flow. Therefore, a movement manipulation of the object can be smoothly executed in accordance with the detected motion vector.

According to a fourth aspect of the present invention, there is provided an object manipulation program for making a control apparatus configured to control a display apparatus execute an object manipulation method of manipulating an object displayed on the display apparatus for deformation. The object manipulation program includes a step of setting, by the control apparatus, a polyhedron with a given point in the object being a center; a step of dividing, by the control apparatus, a space inside the polyhedron by a vector going from the center of the polyhedron to an apex of the polyhedron; a step of discriminating, by the control apparatus, in which of the divided spaces an apex of the object is included; a step of storing, by the control apparatus, a decomposition coefficient of the apex of the object by three vectors making up the space including the apex of the object; and a step of deforming, by the control apparatus, the object in accordance with the deformation manipulation acted on the polyhedron and displaying the deformed object.

The fourth aspect also provides the similar functions and effects as those provided by the first aspect described above.

According to a fifth aspect of the present invention, there is provided an object manipulation program for making a control apparatus configured to control an imaging apparatus and a display apparatus execute an object manipulation method of displaying a moving image taken by the imaging apparatus onto the display apparatus and manipulating an object displayed on the displayed moving image in a composite manner. The object manipulation program includes a step of generating, by the control apparatus, an optical flow on the basis of at least two frame images making up the moving image taken by the imaging apparatus; a step of detecting, by the control apparatus, a motion vector at a display position of the object from the generated optical flow; and a step of manipulating, by the control apparatus, the object on the basis of the detected motion vector.

The fifth aspect provides the similar functions and effects as those provided by the third aspect of the present invention described above.

According to a sixth aspect of the present invention, there is provided an information processing apparatus configured to manipulate an object displayed on a display apparatus for deformation. The information processing apparatus includes polyhedron setting means configured to set a polyhedron with a given point in the object being a center; space division means configured to divide a space inside the polyhedron by a vector going from the center of the polyhedron to an apex of the polyhedron; space discrimination means configured to discriminate in which of the divided spaces an apex of the object is included; decomposition coefficient storage means configured to store a decomposition coefficient of the apex of the object by three vectors making up the space including the apex of the object; and deformation display means configured to deform the object in accordance with the deformation manipulation acted on the polyhedron and display the deformed object.

The sixth aspect also provides the similar functions and effects as those provided by the first aspect described above.

According to a seventh aspect of the present invention, there is provided an information processing apparatus configured to display a moving image taken by an imaging apparatus onto a display apparatus and manipulate an object displayed on the displayed moving image in a composite manner. The information processing apparatus includes optical flow generation means configured to generate an optical flow on the basis of at least two frame images making up the moving image taken by the imaging apparatus; motion vector detection means configured to detect a motion vector at a display position of the object from the optical flow generated by the optical flow generation means; and object manipulation means configured to manipulate the object on the basis of the motion vector detected by the motion vector detection means.

The seventh aspect provides the similar functions and effects as those provided by the third aspect of the present invention described above.

According to an eighth aspect of the present invention, the information processing apparatus according to the seventh aspect further includes manipulation area selection means configured to select an area in which the object is manipulated.

In the information processing apparatus according to the eighth aspect, the selection is made by the manipulation area selection means as a manipulation area. Therefore, a motion vector outside the manipulation area can be prevented from interfering the manipulation of an object.

According to a ninth aspect of the present invention, the information processing apparatus according to the eighth aspect further includes masking means configured to mask the manipulation area selected by the manipulation area selection means.

The information processing apparatus according to the ninth aspect can mask a manipulation area through the masking means, thereby allowing object manipulation in a state in which it is easy for an observer to see a moving image.

BRIEF DESCRIPTION OF DRAWINGS

FIG. 2 is a block diagram illustrating a configuration of the portable terminal in the above-mentioned embodiment.

FIG. 12 is a schematic diagram illustrating a state in which an object image is divided into parts, to each of which a polyhedron is set in the above-mentioned embodiment.

DESCRIPTION OF EMBODIMENTS

The following describes the embodiments of the present invention.

First Embodiment

Figure 1:
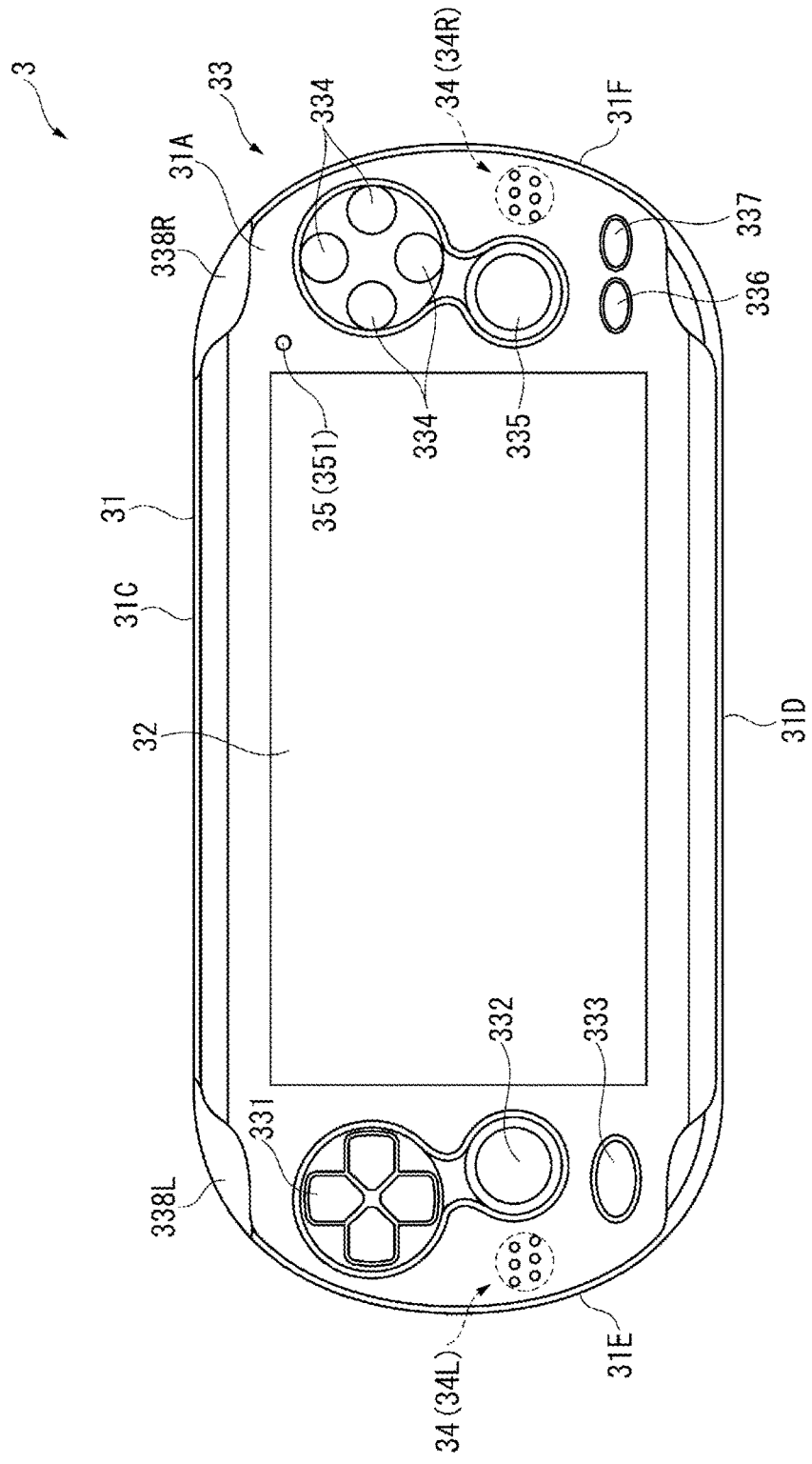
FIG. 1 is a top view illustrating one example of a portable terminal practiced as a first embodiment of the present invention.

Referring to FIG. 1, there is shown a top view indicative of one example of a portable terminal 3 practiced as a first embodiment of the present invention.

The portable terminal 3 displays, in a composite manner, an object on a moving image taken through an imaging block 35. The portable terminal 3 may be configured by a smartphone (a multiple-function portable telephone), a tablet terminal, or a portable game machine, for example. In the present embodiment, as shown in FIG. 1, the portable terminal 3 has a case 31, a display block 32, an operation block 33, an audio output block 34, the imaging block 35, a storage block 36, and a control block 37 (refer to FIG. 2) and is made up of a terminal apparatus that can execute game programs.

The case 31 provides the exterior of the portable terminal 3 and is formed approximately elliptic of a size that allows a user to hold by both hands. This case 31 has a front section 31A, a rear section 31B (not shown in FIG. 1), a top section 31C, a bottom section 31D, and left and right side sections 31E and 31F.

The display block 32 is equivalent to a display apparatus of the present invention and arranged at approximately center of the front section 31A. The display block 32 is made up of a rectangularly formed display panel and displays an image formed by a display control block 371 (refer to FIG. 3A) of the control block 37 to be described later, under the control of the display control block 371. This display panel may be a display panel based on organic EL (Electro-Luminescence) or liquid crystal, for example.

The operation block 33 has various buttons and sticks arranged around the display block 32 in the front section 31A and on the top section 31C of the case 31 concerned and outputs operation signals corresponding to user input operations to the control block 37.

To be more specific, the operation block 33 has direction buttons 331, arranged at the left side of the display block 32, for entering directions of up, down, left and right as viewed with reference to the front section 31A, an operation stick 332 tiltable in each of the above-mentioned directions, and an operation button 333 arranged on the bottom section 31D. In addition, the operation block 33 has four operation buttons 334 arranged at the right side to the display block 32, an operation stick 335 having the same configuration as that of the operation stick 332, and operation buttons 336 and 337 arranged on the bottom section 31D. Further, the operation block 33 has operation buttons 338L and 338R arranged on the left and right sides respectively of the top section 31C.

The audio output block 34 has speakers 34L and 34R arranged respectively in the proximity of the left and right ends in the front section 31A. The audio output block 34 outputs, through the speaker 34L and the speaker 34R, audio corresponding to audio signals entered from an audio output control block 373 (refer to FIG. 3A) of the control block 37 to be described later.

The imaging block 35 is equivalent to an imaging apparatus of the present invention and has a camera 351 that serves as a first imaging block arranged in the upper right of the front section 31A. This imaging block 35 outputs an image taken by the camera 351 to the control block 37.

Referring to FIG. 2, there is shown a block diagram illustrating a configuration of the portable terminal 3. The display block 32, the operation block 33, the audio output block 34, the imaging block 35, the storage block 36, and the control block 37 mentioned above are connected with each other via a bus line BL as shown in FIG. 2.

Of these blocks, the storage block 36 stores programs and data necessary for the operation of the portable terminal 3. For example, the storage block 36 stores an OS (Operating System) for controlling the operation of the portable terminal 3, application programs such as game programs, and an image display program. The storage block 36 such as this can be configured by a nonvolatile memory such as a flash memory and an HDD (Hard Disk Drive).

Figure 3A:
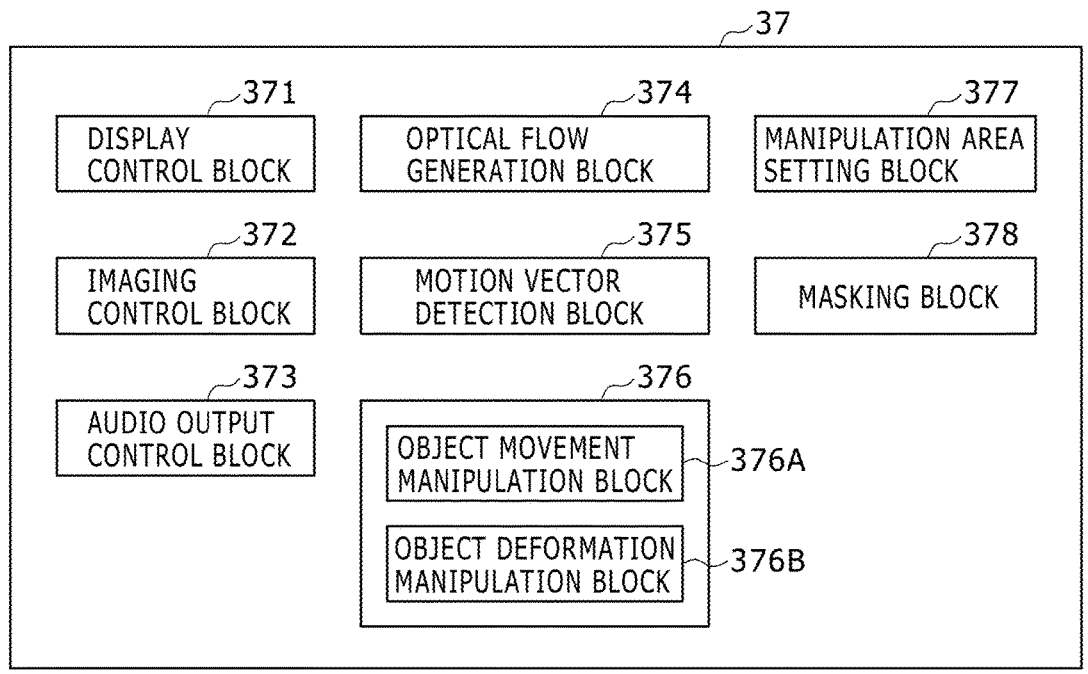
FIG. 3A is a block diagram illustrating a configuration of a control block in the above-mentioned embodiment.
Figure 3B:
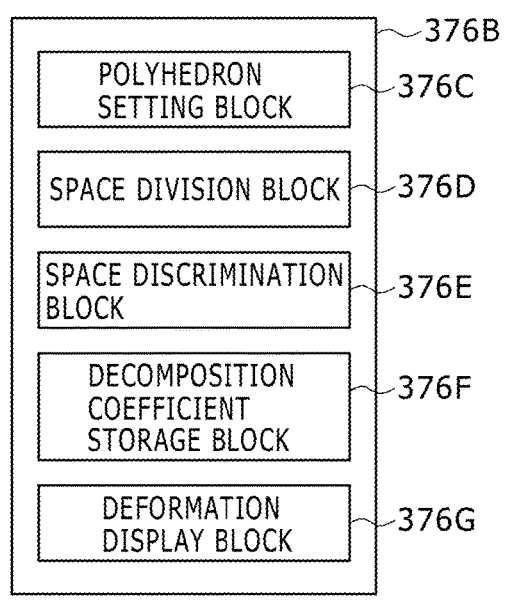
FIG. 3B is a block diagram illustrating a configuration of the control block in the above-mentioned embodiment.

FIG. 3A and FIG. 3B are block diagrams indicative of a configuration of the control block 37.

The control block 37 has a CPU (Central Processing Unit) and so on and controls the operation of the portable terminal 3. To be more specific, the control block 37 is a control apparatus configured to control, by reading programs from the storage block 36 and processing the read program by the CPU, the portable terminal 3 in accordance with input operations done by a user (namely, operation signals entered from the operation block 33) or in an autonomous manner.

In addition, the control block 37 displays a moving image taken through the imaging block 35 onto the display block 32 by the execution of the above-mentioned image display program by the CPU. For realizing this, the control block 37 has the display control block 371, an imaging control block 372, the audio output control block 373, an optical flow generation block 374, a motion vector detection block 375, an object manipulation block 376, a manipulation area selection block 377, and a masking block 378 as illustrated in FIG. 3A.

The display control block 371 draws an image indicative of an operation state of the portable terminal 3 or an image taken by the imaging block 35 on a drawing memory (not shown) and outputs the drawing image in the form of an image signal to the display block 32, thereby displaying this image on the display block 32.

Figure 4:
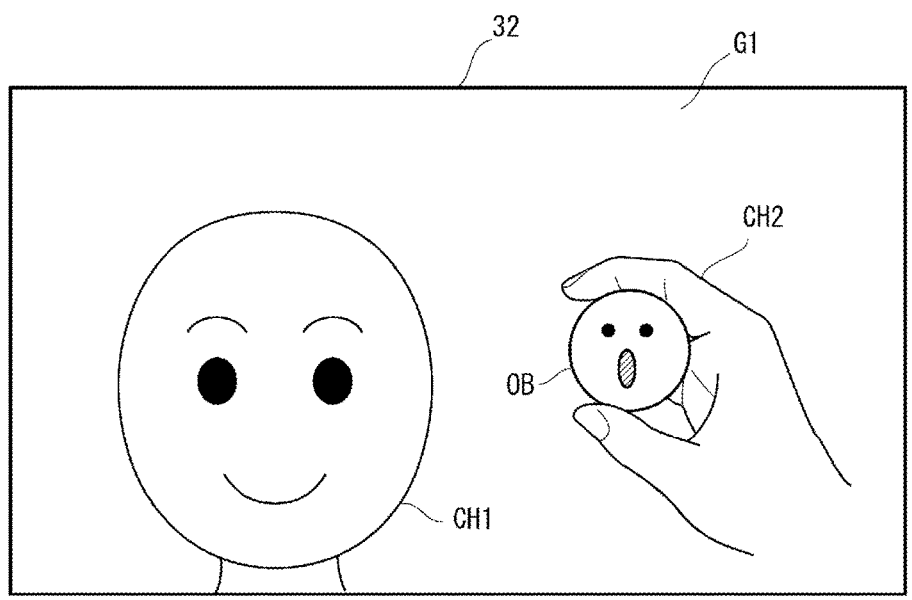
FIG. 4 is a schematic diagram illustrating a screen with a moving image displayed on a display block of the portable terminal in the above-mentioned embodiment, displaying an object image.

To be more specific, a moving image taken by the imaging block 35 is displayed on the display block 32 and an object image OB is displayed on this moving image in a composite manner as shown in FIG. 4.

The imaging control block 372 controls an operation of the imaging block 35. To be more specific, the imaging control block 372 makes the imaging block 35 take an image with a predetermined period (or frame rate). Then, the imaging control block 372 acquires a moving image that is a taken image entered from the imaging block 35 to store the acquired moving image into the storage block 36.

The audio output control block 373 controls the audio output block 34 to output predetermined audio.

The optical flow generation block 374 generates an optical flow from at least two or more frame images G1 and G2 that make up a moving image.

Figure 5:
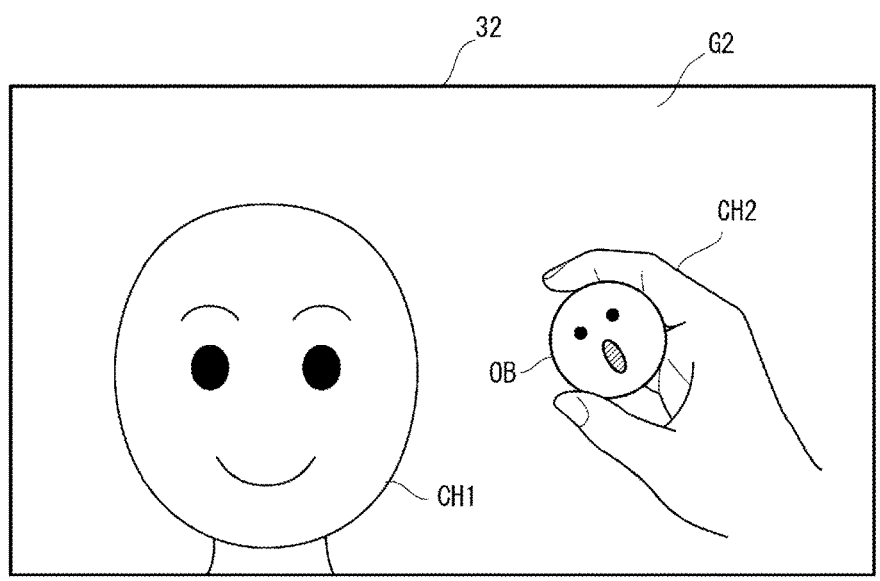
FIG. 5 is a schematic diagram illustrating a screen with a moving image displayed on the display block of the portable terminal in the above-mentioned embodiment, displaying an object image.

Suppose here that transition is made from the frame image G1 shown in FIG. 4 to the frame image G2 shown in FIG. 5, then an image CH1 of a face in the moving image slides in the right direction and an image CH2 of a hand finger part is rotated.

Figure 6:
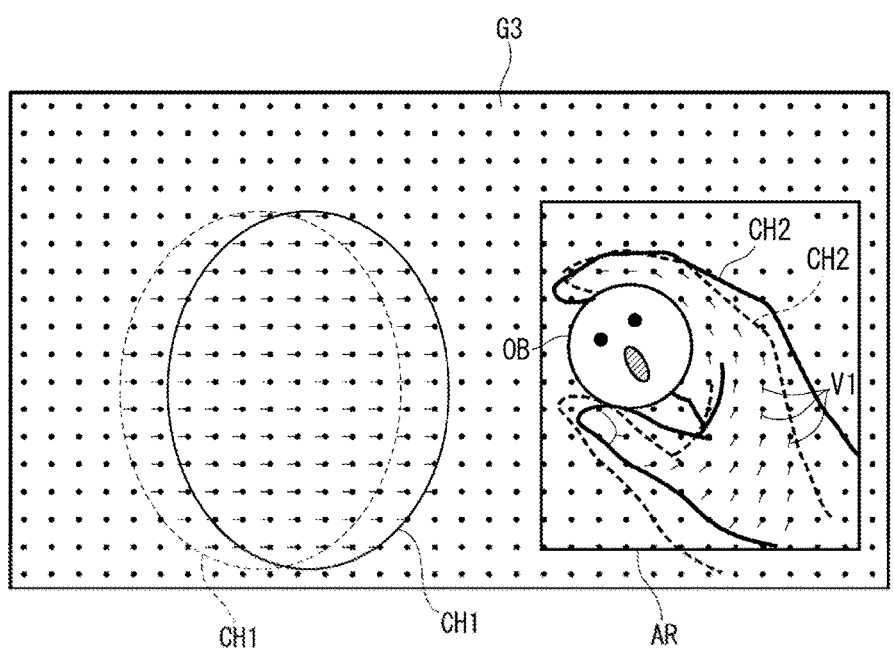
FIG. 6 is a schematic diagram illustrating a screen on which an optical flow in the above-mentioned embodiment is displayed.

From the movement of luminance points of these two frame images G1 and G2, the optical flow generation block 374 generates an optical flow G3 as shown in FIG. 6. The optical flow G3 can be obtained by use of a known method such as a gradient method or a block matching method. In the gradient method, a relational expression between space-time differential and optical flow is derived from an assumption that the brightness of a point on an object does not change after movement, thereby estimating the movement of a target.

On the other hand, in the block matching method, an image is divided into small areas of a certain size so as to obtain a motion vector of each block. Each block is searched for the correspondence with a particular location of a previous frame so as to use a positional difference from the corresponding block as a motion vector.

By use of any one of these methods, the optical flow G3 computes the moving direction and moving speed of the images CH1 and CH2 on the basis of a frame rate or the like from the two frame images G1 and G2, thereby generating a motion vector.

Of the optical flow G3 generated by the optical flow generation block 374, the motion vector detection block 375 detects a motion vector at a location where the object image OB is displayed. In the change from FIG. 4 to FIG. 5, the image CH2 of the hand finger part is displayed around the object image OB, the hand finger part being rotated in the left direction, which is detected as a motion vector V1.

The object manipulation block 376 is a block configured to move and deform an object image OB on the basis of a motion vector V1 around the object image OB detected by the motion vector detection block 375 and has an object movement manipulation block 376A and an object deformation manipulation block 376B.

The object movement manipulation block 376A computes the movement direction and movement amount of an object image OB in accordance with the direction and magnitude of a detected motion vector V1 and displays the object image OB at a proper position on the display block 32 in a composite manner.

Figure 7A:
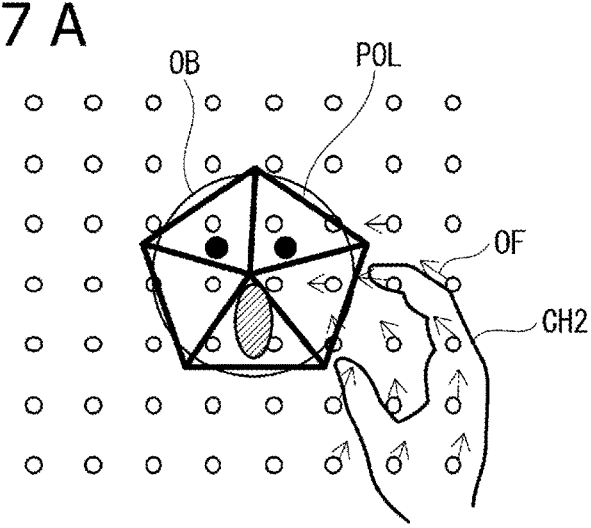
FIG. 7A is a schematic diagram illustrating the description of motion vector detection from an optical flow in the above-mentioned embodiment.

To be more specific, as shown in FIG. 7A, when an optical flow OF is detected around an object image OB, the motion vector detection block 375 detects a motion vector V1 of a polyhedron POL from an optical flow OF in the proximity of the apex of the polyhedron POL set to the object image OB. An optical flow OF is discretely obtained for each pixel of the display block 32; actually, an optical flow is obtained from an optical flow of a surrounding pixel coordinate in an interpolation manner for the optical flow of an apex to be obtained.

Figure 7B:
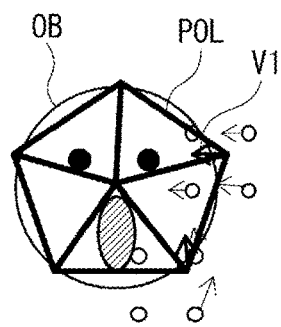
FIG. 7B is another schematic diagram illustrating the description of motion vector detection from an optical flow in the above-mentioned embodiment.
Figure 7C:
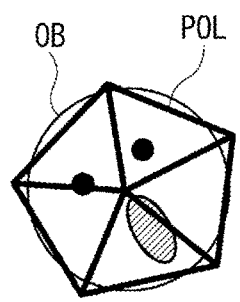
FIG. 7C is still another schematic diagram illustrating the description of motion vector detection from an optical flow in the above-mentioned embodiment.

On the basis of the motion vector V1 detected by the motion vector detection block 375A, the object movement manipulation block 376A deforms the polyhedron POL as shown in FIG. 7B and then rotates the polyhedron POL while keeping the form of the polyhedron POL under original inter-apex constraint conditions or the like as shown in FIG. 7C, thereby moving the object OB in accordance with the rotary movement of the polyhedron POL.

Figure 8:
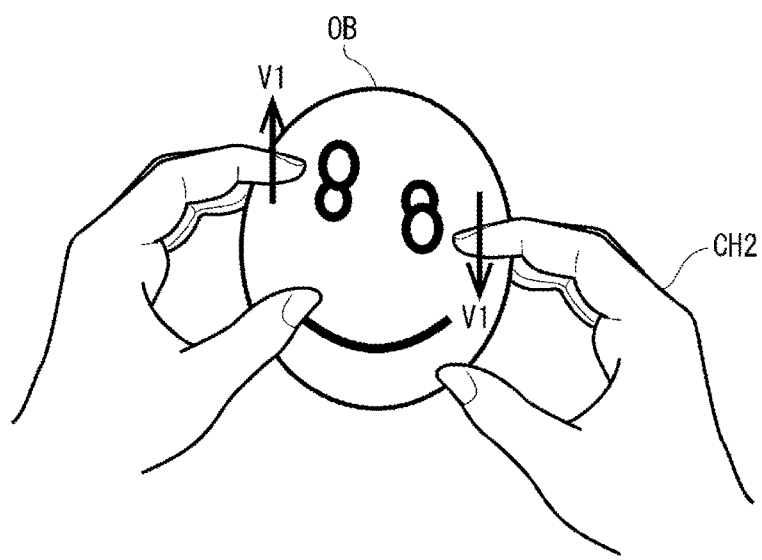
FIG. 8 is a schematic diagram illustrating a state in which an object image is deformed in the above-mentioned embodiment.

The object deformation manipulation block 376B computes the deformation direction and deformation amount of an object image OB in accordance with the direction and magnitude of a motion vector V1 around the object image OB detected by the motion vector detection block 375 and deforms the object image OB so as to display the deformed object image OB onto the display block 32 in a composite manner. This object deformation manipulation block 376B has a polyhedron setting block 376C, a space division block 376D, a space discrimination block 376E, a decomposition coefficient storage block 376F, and a deformation display block 376G as shown in FIG. 3B. To be more specific, as shown in FIG. 8, when an image CH2 of a hand finger part moves up and down in an object image OB, the object image OB is displayed on the display block 32 in a state in which the object image OB is deformed up and down by the motion vector V1.

Figure 9:
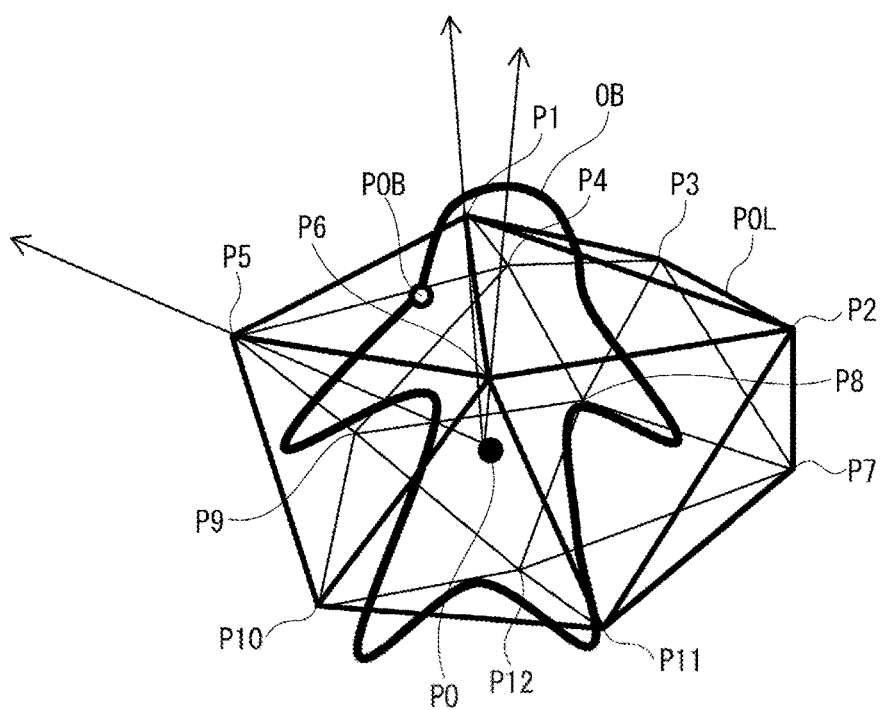
FIG. 9 is a schematic diagram illustrating a polyhedron set to an object image in the above-mentioned embodiment.

For the deformation of an object image OB, the polyhedron setting block 376C sets a center point P0 at a given position inside the object image OB, thereby setting a polyhedron POL with the center point P0 being the center, as shown in FIG. 9.

In the present embodiment, a polyhedron POL is defined as a projecting polyhedron having 12 apexes P1 through P12; if a space can be uniquely divided in area, then a polyhedron may be set as desired in accordance with the shape or the like of an object image OB.

A polyhedron POL may not be related with the shape of an object image OB or may be set by use of an apex POB of an object image OB. Preferably, a polyhedron POL is set such that a part of hand and foot of an object image OB that are to be moved is used as an apex to cover the entire object image OB and the magnitude thereof is reduced as far as possible.

The space division block 376D divides the space inside a polyhedron POL into two or more spaces by vectors extending from the center point P0 to the apexes P1 through P12 of the polyhedron POL.

Next, the space discrimination block 376E discriminates that a given apex POB of the object image OB is included in a space made up of the center point P0 and the apexes P1, P4, and P5 of the polyhedron POL.

Figure 10:
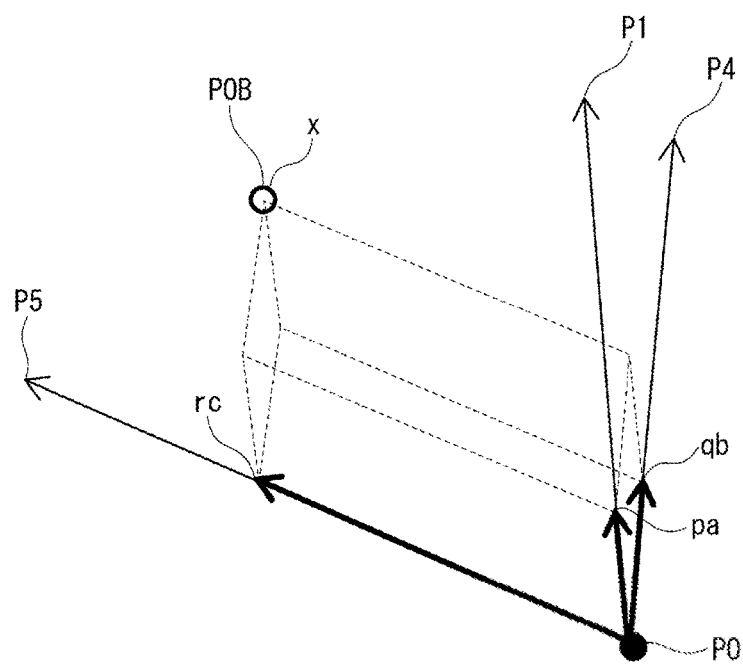
FIG. 10 is a schematic diagram illustrating given apex of an object image by a space inside a polyhedron in the above-mentioned embodiment.

The decomposition coefficient storage block 376F stores a position x of a given apex POB by a vector a going from the center point P0 to the apex P1, a vector b going from the center point P0 to the apex P4, a vector c going from the center point P0 to the apex P5, and the respective decomposition coefficients p, q, and r, as shown in FIG. 10.

That is, the position x of the given apex POB of the object image OB is expressed by following equation (1).

$$x = pa + qb + rc \quad (1)$$

Figure 11:
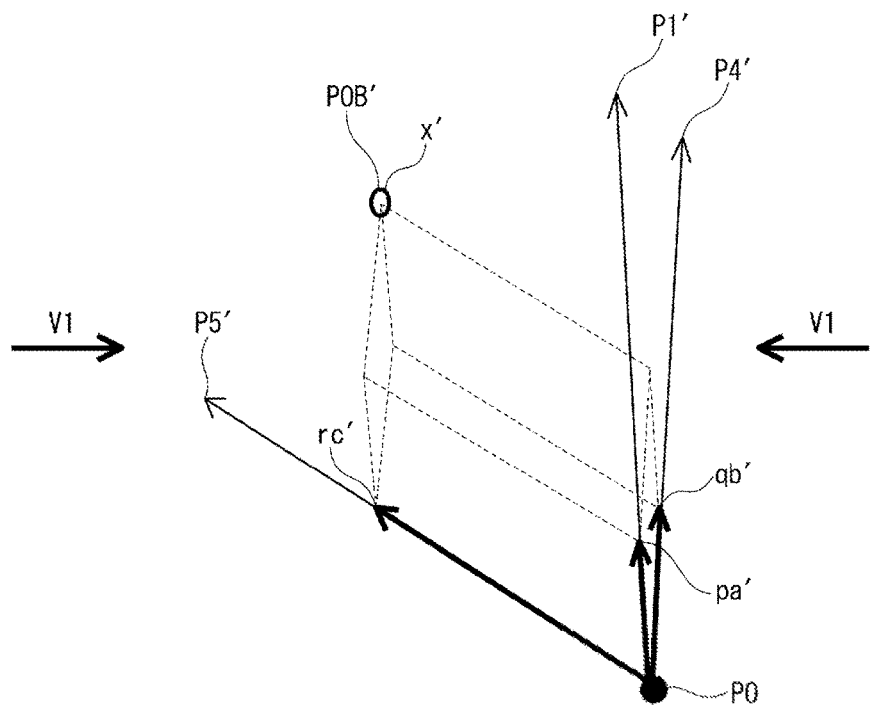
FIG. 11 is a schematic diagram illustrating a positional relation between given apexes of an object image at the time when a polyhedron is deformed in the above-mentioned embodiment.

When a motion vector V1 for deforming a polyhedron POL is detected, for example, the deformation display block 376G deforms the space in the polyhedron POL by changing the apex P1, the apex P4, and the apex P5 shown in FIG. 10 to an apex P1', an apex P4', and an apex P5' in accordance with the detected motion vector V1, as shown in FIG. 11. Accordingly, as shown in an equation (2) below, the deformation display block 376G stores the equation (1) stored above at a position x' of a given apex POB of the object image OB in accordance with the motion vector V1 and displays the deformed object image OB on the display block 32.

$$x' = pa' + qb' + qc' \quad (2)$$

As shown in FIG. 12, the object deformation manipulation block 376B can not only set one polyhedron POL to an object image OB, but also divide an object image OB into two or more parts, e.g. head, hand, and foot, in advance and set part polyhedrons PA1 through PA5 to each part, thereby storing the position of a given apex of each part into the respective part polyhedrons PA1 through PA5 in the form of the above-mentioned equation (1).

In this case, the deformation of an object image OB is realized by the following method.

First, the lower part polyhedrons PA1 through PA5 are regarded as an object, and the part polyhedrons PA1 through PA5 are deformed and moved by deforming the upper polyhedron POL. Next, the object image OB deforms and moves in accordance with the deformation of the lower part polyhedrons PA1 through PA5 to which each part of the object image OB belongs. In the deformation of the object image OB, the lower part polyhedrons PA1 through PA5 may be directly deformed without setting the upper polyhedron POL.

For example, in order to deform the hand part of the object image OB, only the part polyhedron PA3 set to this hand part needs to be deformed.

On the other hand, if a deformation manipulation affects the entire object image OB, e.g. if a deformation manipulation is executed on a display image in which the object image OB is caught in an ocean swirling current for example, the manipulation may be executed as the deformation and movement manipulations of the upper polyhedron POL.

Further, it is also practicable to execute complex operations in which the upper polyhedron POL is combined with the lower part polyhedrons PA1 through PA6. To be more specific, assume a display image in which the object image OB collides with a rock in a river flow, then a deformation and movement manipulation in the river flow can be executed in the upper polyhedron POL and a deformation manipulation in the collision with the rock can be executed in the part polyhedrons PA1 through PA6. A layer structure such as this eliminates discrepancy between total deformation and partial deformation.

To which of the part polyhedrons PA1 through PA5 each part of the object image OB belongs can be determined by the decomposition coefficient of each vector. Each part of the object image OB is selected such that there is no superimposition between the part polyhedrons PA1 through PA5.

Further, if an apex P13 is included in the part polyhedron PA3 as with the apex P13 of the object image OB, then the decomposition coefficients p, q, and r in the equation (1) are set in a range of 0 to 1. On the other hand, if an apex P14 is not included in the part polyhedron PA3 or the part polyhedron PA4 as with the apex P14 of the object image OB, then a square sum of the decomposition coefficients p, q, and r in the expression (1) may be obtained for each of the part polyhedrons PA3 and PA4 and making a comparison between the results, thereby deforming the apex P14 of the object image OB by assuming that the part concerned belongs to the smaller part polyhedron.

The manipulation area selection block 377 selects an area in which an object image OB to be manipulated exists as a manipulation area AR.

Further, the manipulation area AR may also be selected by use of a known image recognition technology such as a face recognition technology in which the optical flow in the area of the image CH1 of the face shown in FIG. 6 is excluded and an optical flow of only the part of the image CH2 of the hand finger part is generated.

Further still, since the interval of the optical flow of the image CH1 of the face is detected wide and the image CH2 of the hand finger part is generated narrow, the manipulation area AR may be selected by use of these detection and generation.

The masking block 378 is means of facilitating manipulation by masking a manipulation area AR; for example, the visibility of an manipulation area is enhanced by putting moving images outside a manipulation area AR into a non-display state, converting an image of a manipulation area AR into a binary image with contrast enhanced without leaving the image of the manipulation area AR as a moving image, displaying only a contour image, or replacing the image into an object image like an icon.

Figure 13:
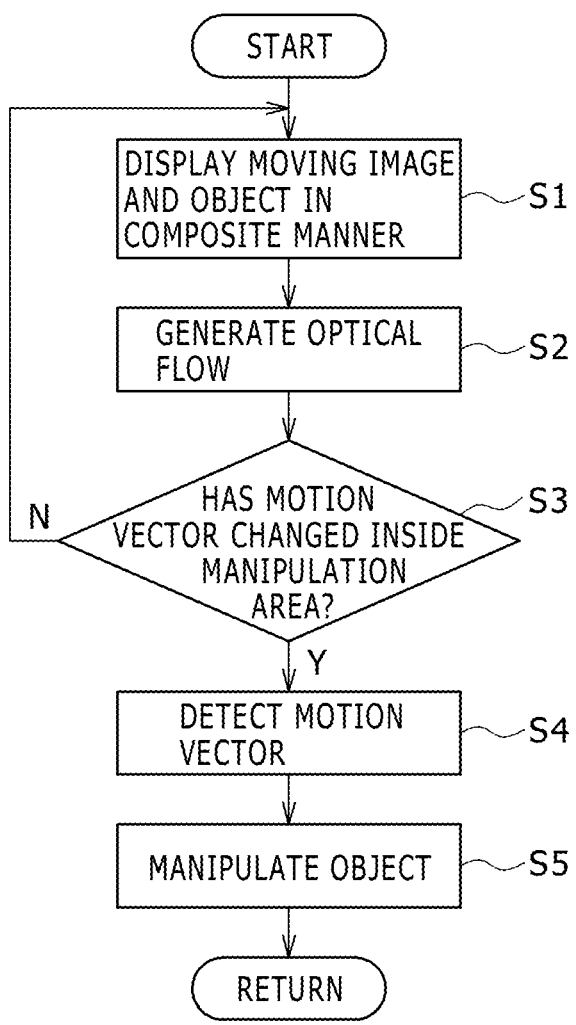
FIG. 13 is a flowchart indicative of functions in the above-mentioned embodiment.

The following describes functions of the present embodiment with reference to a flowchart shown in FIG. 13. First, the display control block 371 displays a moving image taken by the imaging block 35 and an object image OB read from the storage block 36 onto the display block 32 in a composite manner (step S1)

The optical flow generation block 374 generates an optical flow G3 on the basis of frame images G1 and G2 that make up the moving image (step S2).

The motion vector detection block 375 monitors the optical flow G3 in the manipulation area AR (step S3) and, if a change occurs in the motion vector in the manipulation area AR, detects the direction and the magnitude of the motion vector V1 (step S4).

On the basis of the detected motion vector V1, the object manipulation block 376 computes the movement direction and movement amount of the object image OB and displays the object image OB at a proper position on the display block 32 in a composite manner (step S5).

It should be noted that the sequence of object manipulation methods from step S1 to step S5 is stored in the storage block 36 as a computer-readable program and read out and executed by the control block 37 in displaying the moving image taken by the imaging block 35 onto the display block 32.

According to the present embodiment described above, the following effects can be obtained.

Since the optical flow G3 of a moving image is generated by the optical flow generation block 374 and the motion vector V1 at the display position of the object image OB is detected by the motion vector detection block 375, a movement manipulation of the object image OB can be smoothly executed by the object manipulation block 376 in accordance with the detected motion vector V1.

The selection is made by the manipulation area selection block 377 as a manipulation area AR, thereby preventing a motion vector outside a detection area from interfering the manipulation of an object image OB.

The masking block 378 is arranged so as to mask a manipulation area AR, thereby allowing the manipulation of an object image OB in a state in which it is easy for an observer to see a moving image.

The object deformation manipulation block 376B sets a polyhedron POL with a given center point P0 in an object image OB being the center, divides the space in the polyhedron POL by vectors moving from the center point P0 of the polyhedron POL toward apexes P1 through P12, determines in which of the divided spaces an apex POB of the object image OB is included, stores decomposition coefficients p, q, and r of a position x of an apex of the object by three vectors making up the space including the apex of the object, and deforms the object image OB in accordance with an deformation manipulation executed on the polyhedron POL, thereby displaying the deformed object image OB. Therefore, unlike the skinning based on bones, the weighted addition of an orthogonal coordinate system of two or more bones need not be executed, thereby mitigating the arithmetic processing load of the control block 37.

In addition, since the object deformation manipulation block 376B can set part polyhedrons PA1 through PA5 for each part of the object image OB and execute deformation manipulation on each of the part polyhedrons PA1 through PA5, even an object image OB having a complicated form can be deformed and displayed in accordance with the deformation manipulation, thereby also mitigating the arithmetic processing load.

Second Embodiment

The following describes a second embodiment of the present invention. It should be noted that, in what follows, the same reference signs are attached to the parts same as the parts described so far and the description of the same parts will be skipped.

In the first embodiment described above, the optical flow G3 is generated from a moving image taken by the camera 351 of the imaging block 35, the motion vector V1 is detected on the basis of the generated optical flow G3, and the object image OB is manipulated for deformation on the basis of this motion vector V1.

The present embodiment is, however, different from the first embodiment in that an animation for deformation of an apex sequence of a polyhedron POL is created by an animation creation tool or the like and the object image OB is made to follow the animation.

To be more specific, as shown in FIG. 14(A), first, a polyhedron POL is set to an object image OB as a key frame image as with the first embodiment.

Next, if this key frame image is manipulated for deformation and a key frame image shown in FIG. 14(B) and a key frame image shown in FIG. 14(D) are set for example, then an image shown in FIG. 14(C) between these figures is generated by the interpolation with a differential image of the coordinates of an apex to be moved and the deformation manipulations of the polyhedron POL shown in FIGS. 14(A) through (D) are stored.

In displaying an image, making the object image OB follow this animation allows the deformed images of the object image OB as shown in FIGS. 14(E) through (G) to be displayed.

The method described above can also provide the similar functions and effects as those of the first embodiment described above.

Third Embodiment

The following describes a third embodiment of the present invention. In the second embodiment described above, deformation of a polyhedron POL is executed by use of an animation creation tool.

Figure 15:
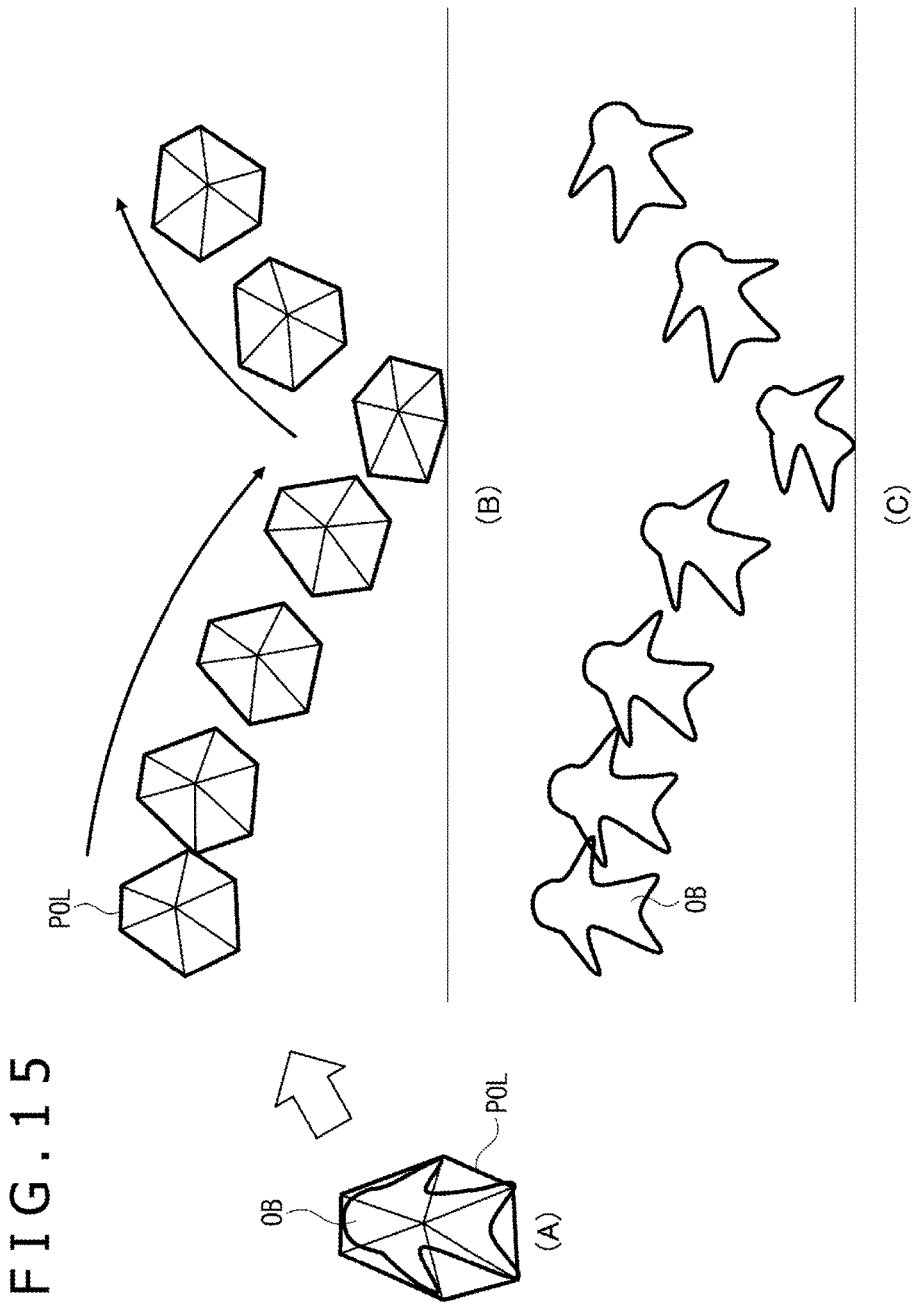
FIG. 15 is a schematic diagram illustrating the deformation and movement of an object image practiced as a third embodiment of the present invention.
Figure 16:
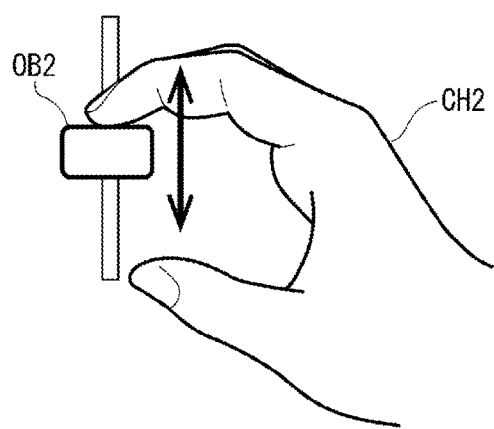
FIG. 16 is a schematic diagram illustrating an object image that is a variation of the above-mentioned embodiment.

The present embodiment is, however, different from the second embodiment in that a polyhedron POL is deformed and moved by use of physical simulation by a physical computation engine software program as shown in FIG. 15. To be more specific, as shown in FIG. 15(A), a polyhedron POL is set to an object image OB as with the second embodiment.

Next, as shown in FIG. 15(B), a state in which the polyhedron POL is deformed on a physical computation engine software program in accordance with the collision and movement based on natural laws is stored.

It should be noted that, for a target of physical simulation, the relationship between apexes of the polyhedron POL itself may be physically simulated; it is also practicable to physically simulate a rigid body made up of two or more apexes so as to identify a polyhedron POL from the apexes making up the rigid body that is a result of the simulation.

In manipulating an object image OB on a physical computation engine software program for deformation and movement, since the number of apexes of a polyhedron POL is smaller than the number of apexes of the object image OB to be drawn, the load of drawing can be mitigated, making it easy to adopt the data structure of an existing physical computation engine software program and providing an advantage of flexible applicability.

In displaying an image, as shown in FIG. 15(C), by making the object image OB follow the deformation and movement based on the physical simulation of this polyhedron POL, the images of deformation and movement of the object image OB can be displayed.

Variations of Embodiments

It should be noted that the present invention is not limited to the embodiments mentioned above but includes the following variation.

Figure 14:
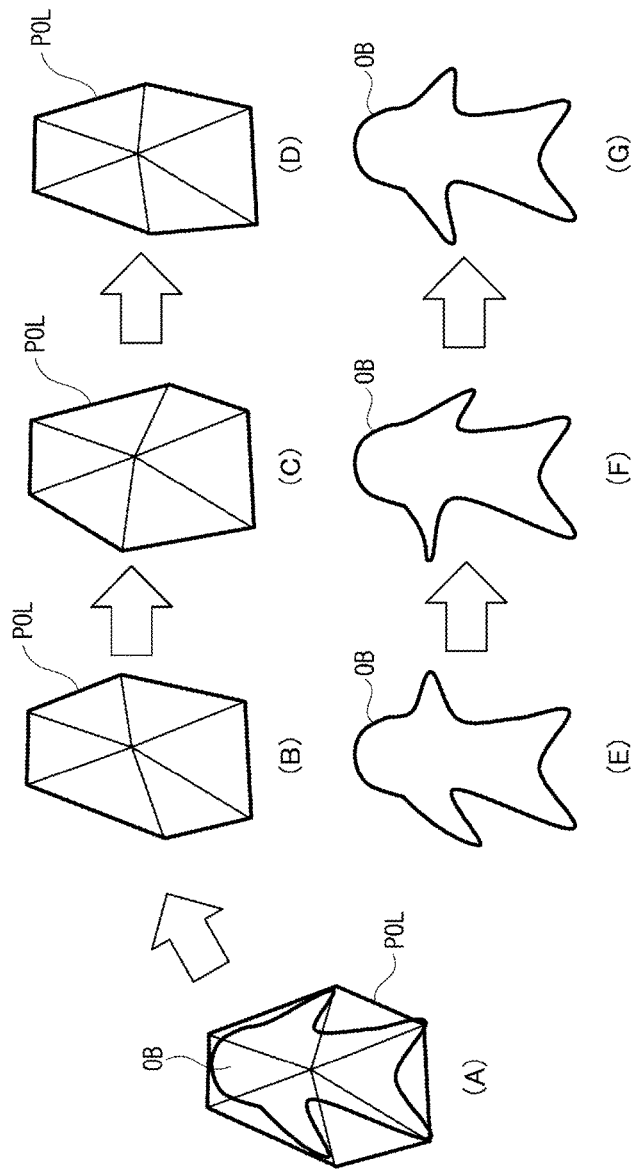
FIG. 14 is a schematic diagram illustrating the deformation and movement of an object image practiced as a second embodiment of the present invention.

In the embodiments described above, the object manipulation block 376 manipulates a character-like object image OB; it is also practicable to fixedly display a slide switch image OB2 as shown in FIG. 14 at somewhere on the display block 32 in advance and execute a manipulation of sliding this image by an image CH2 of a hand finger part, for example.

The embodiments of the present invention can use other configurations than those described above within a range in which the object of present invention is attainable.

REFERENCE SIGNS LIST

3 . . . Portable terminal, 31 . . . Case, 31A . . . Front section, 31C . . . Top section, 31E . . . Side section, 32 . . . Display block, 33 . . . Operation block, 331 . . . Direction button, 332 . . . Operation stick, 333 . . . Operation button, 334 . . . Operation button, 335 . . . Operation stick, 336 . . . Operation button, 338L . . . Operation button, 34 . . . Audio output block, 34L . . . Speaker, 35 . . . Imaging block, 351 . . . Camera, 36 . . . Storage block, 37 . . . Control block, 371 . . . Display control block, 372 . . . Imaging control block, 373 . . . Audio output control block, 374 . . . Optical flow generation block, 375 . . . Vector detection block, 376 . . . Object manipulation block, 376A . . . Object movement manipulation block, 376B . . . Object deformation manipulation block, 376C . . . Polyhedron setting block, 376D . . . Space division block, 376E . . . Space discrimination block, 376F . . . Decomposition coefficient storage block, 376G . . . Deformation display block, 377 . . . Manipulation area selection block, 378 . . . Masking block, AR . . . Manipulation area, BL . . . Bus line, CH1, CH2 . . . Image, G1, G2 . . . Frame image, G3 . . . Optical flow, OB . . . Object image, OB2 . . . Slide switch image.

The invention claimed is:

1. An object manipulation method of manipulating an object displayed on a display apparatus for deformation, the object manipulation method comprising:
    setting a manipulation area surrounding the object;
    capturing a moving image using a camera, the moving image comprising a manipulation instruction for the object within the manipulation area;
    determining an optical flow within the manipulation area based on frame images from the moving image;
    setting, by a control apparatus configured to control the display apparatus, a projecting polyhedron bounding the object,
    wherein the projecting polyhedron comprises a given point in the object being a center;
    dividing, by the control apparatus, the bounding polyhedron into a plurality of spaces inside the bounding polyhedron, with each of the plurality of spaces formed by vectors extending from the given point to apexes of the bounding polyhedron;
    for each vertex of the object:
        determining which space of the plurality of spaces each vertex is included in;
        projecting each vertex of the object onto each bounding vertex of the space each vertex is included to determine a decomposition coefficient for each bounding vertex;
    determining a motion vector in the manipulation area based on the optical flow;
    deforming the bounding polyhedron using the motion vector;
    calculating a new position of each vertex of the object based on the deformed bounding polyhedron and the decomposition coefficients; and
    displaying the object using the new position of each vertex of the object.

2. The object manipulation method according to claim 1, wherein
    the object is divided into a plurality of parts in advance and a distinct bounding polyhedron is set for each of the plurality of parts.

3. A non-transitory computer readable medium having stored thereon an object manipulation program for making a control apparatus configured to control a display apparatus execute an object manipulation method of manipulating an object displayed on the display apparatus for deformation, the object manipulation program comprising:
    setting a manipulation area surrounding the object;
    capturing a moving image using a camera, the moving image comprising a manipulation instruction, from a user, for the object within the manipulation area;
    determining an optical flow within the manipulation area based on frame images from the moving image;
    setting, by a control apparatus configured to control the display apparatus, a projecting polyhedron bounding the object,
    wherein the projecting polyhedron comprises a given point in the object being a center;
    dividing, by the control apparatus, the bounding polyhedron into a plurality of spaces inside the bounding polyhedron, with each of the plurality of spaces formed by vectors extending from the given point to apexes of the bounding polyhedron;
    for each vertex of the object:
        determining which space of the plurality of spaces each vertex is included in;
        projecting each vertex of the object onto each bounding vertex of the space each vertex is included to determine a decomposition coefficient for each bounding vertex;
    determining a motion vector in the manipulation area based on the optical flow;
    deforming the bounding polyhedron using the motion vector;
    calculating a new position of each vertex of the object based on the deformed bounding polyhedron and the decomposition coefficients; and
    displaying the object using the new position of each vertex of the object.

4. An information processing apparatus configured to manipulate an object displayed on a display apparatus for deformation, comprising:
    manipulation area setting means for setting a manipulation area surrounding the object;
    imaging means for capturing a moving image using a camera, the moving image comprising a manipulation instruction, from a user, for the object within the manipulation area;
    optical flow generation means for determining an optical flow within the manipulation area based on frame images from the moving image;
    polyhedron setting means configured to set a bounding polyhedron for the object,
    wherein the projecting polyhedron comprises a given point in the object being a center;
    space division means configured to divide the bounding polyhedron into a plurality of divided spaces inside the bounding polyhedron, with each of the plurality of spaces formed by vectors extending from the given point to apexes of the bounding polyhedron;
    space discrimination means configured to discriminate in which of the divided spaces each apex of the object is included in;
    decomposition coefficient storage means for expressing each apex of the object as the sum of three vectors making up the divided space including the apex, with each of the three vectors weighted by a corresponding decomposition coefficient;
    deforming means for determining deformed vectors for each of the vectors extending from the given point to apexes of the bounding polyhedron based on the optical flow,
    determining new coordinates for each apex of the object using the deformed vectors and the decomposition coefficients; and
    displaying the object on the display apparatus using the new coordinates for each apex of the object.

* * * * *